United States Patent [19]

Sorensen

[11] Patent Number: 5,023,039
[45] Date of Patent: Jun. 11, 1991

[54] HOLD-PRESSURE CONTROL IN MULTI-PARTING INJECTION MOLDING SYSTEM

[75] Inventor: Jens O. Sorensen, Rancho Santa Fe, Calif.

[73] Assignee: Primtec, Rancho Santa Fe, Calif.

[21] Appl. No.: 327,373

[22] Filed: Mar. 22, 1989

Related U.S. Application Data

[63] Continuation of Ser. No. 70,850, Jul. 8, 1987, abandoned.

[51] Int. Cl.$^5$ .................. B29C 45/12; B29C 45/57
[52] U.S. Cl. ...................... 264/297.2; 264/328.8; 264/328.11; 425/555; 425/557; 425/562; 425/572; 425/588
[58] Field of Search ............... 264/297.2, 328.1, 328.8, 264/328.11, 328.12; 425/149, 555, 557, 558, 559, 561, 562, 572, 588, 574

[56] References Cited

U.S. PATENT DOCUMENTS

| | | |
|---|---|---|
| 3,671,162 | 6/1972 | Lohmann . |
| 3,707,342 | 12/1972 | Lohmann . |
| 3,709,644 | 1/1973 | Farrell ................................. 425/160 |
| 3,847,525 | 11/1974 | Bielfeldt et al. ..................... 425/555 |
| 4,090,837 | 5/1978 | Balevski et al. ..................... 425/588 |
| 4,242,073 | 12/1980 | Tsuchiya et al. ................... 425/555 |
| 4,342,717 | 8/1982 | Gardner ............................ 264/328.8 |
| 4,400,341 | 8/1983 | Sorensen .......................... 264/328.8 |
| 4,464,327 | 8/1984 | Sorensen .......................... 264/331.11 |

FOREIGN PATENT DOCUMENTS 58-166030 10/1983 Japan .

*Primary Examiner*—Jill L. Heitbrink
*Attorney, Agent, or Firm*—Edward W. Callan

[57] ABSTRACT

A system and method of controlling hold pressure to cooling cavities when cyclic injection molding a thermoplastic material by utilizing a combination of a multi-parting mold system and an injection unit which together encompass a bifurcated feed system with a molten core. The mold system includes a center part that joins end parts at parting surfaces to define first and second cooling cavities. The feed system is defined by the injection unit and the center part and includes a runner orifice from the injection unit and bifurcated branches. A valve is located in the runner orifice. The first branch feeds injected thermoplastic material to the first cooling cavity, and the second branch feeds injected thermoplastic material to the second cooling cavity. The valve is closed each time after molten thermoplastic material is separately injected under pressure into each of the cooling cavities to hold pressurize the plastic material in the respective cooling cavities. Piston(s) connected to the branches of the feed system may be used for further increasing the hold pressure by protracting the piston and for depressurizing the branches by retracting the piston.

6 Claims, 1 Drawing Sheet

HOLD-PRESSURE CONTROL IN MULTI-PARTING INJECTION MOLDING SYSTEM

This is a continuation of co-pending application Ser. No. 07/070,850 filed on July 8, 1987, now abandoned.

BACKGROUND OF THE INVENTION

The present invention generally pertains to injection molding and is particularly directed to control of hold pressure in a multi-parting injection molding system.

Hold pressure is the pressure applied to plastic material injected into a cooling cavity after the cooling cavity is initially filled by an injection unit. Hold pressure is applied to force additional plastic material into the cooling cavity as the initially injected material shrinks in the mold upon cooling in order to assure that the plastic material completely fills the cavity. Otherwise the molded product may be crimped.

In the prior art, the injection unit is used to apply hold pressure. However, when using a multi-parting molding system, the use of the molding unit to apply hold pressure may increase the cycle time. Also, with typical stack mold systems, when the stack mold is opened and the injection unit is being recharged, the injection unit is separated from the remainder of the feed system that carries the plastic material to the cooling cavities, thereby reducing the time available for the injection unit to apply pressure.

SUMMARY OF THE INVENTION

The present invention provides an improved system and method of controlling hold pressure to cooling cavities when cyclic injection molding a thermoplastic material by utilizing a combination of a multi-parting mold system and an injection unit which together encompasses a bifurcated feed system with a molten core, the feed system comprising a valve, a first branch for feeding a first cooling cavity encompassed by a first parting surface and a second branch for feeding a second cooling cavity encompassed by a second parting surface.

The present invention also provides an improved system and method of controlling hold pressure to cooling cavities when cyclic injection molding a thermoplastic material by utilizing a combination of a multi-parting mold system and an injection unit which together encompass a bifurcated feed system with a molten core, the feed system comprising a first branch with a first valve for feeding a first cooling cavity encompassed by a first parting surface and a second branch with a second valve for feeding a second cooling cavity encompassed by a second parting surface.

The features of the invention are described with reference to the description of the preferred embodiments.

DESCRIPTION OF THE PREFERRED EMBODIMENT

Figure 1:
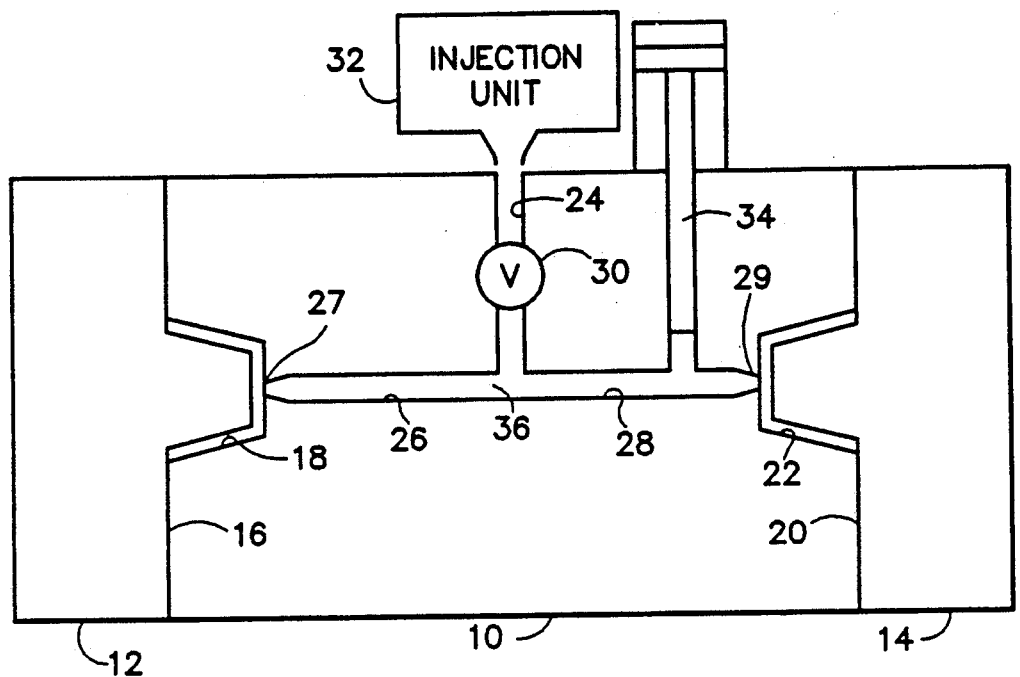
FIG. 1 illustrates one preferred embodiment of the present invention.

Referring to FIG. 1, a preferred embodiment of a multi-part molding system for practising the present invention includes a center part 10 and end parts 12 and 14. The center part 10 and one end part 12 join at a first parting surface 16 and define a first cooling cavity 18. The center part 10 and the other end part 14 join at a second parting surface 20 and define a second cooling cavity 22. The center part 10 may be either a center platten of a molding machine or the center part of a stack mold. An injection unit 32 and the center part 10 define a feed system with a molten core. The feed system includes a runner orifice 24, a first branch 26 and a second branch 28. The first branch 26 terminates in a gate 27 to the first cooling cavity 18; and the second branch 28 terminates in a gate 29 to the second cooling cavity 22. A valve 30 controls the flow of plastic material through the runner orifice 24. An injection unit 32 is disposed to inject molten thermoplastic material into the runner orifice 24. The injection unit 32 is separated from the remainder of the feed system when not being pressurized to inject the plastic material into the runner orifice 24. A piston means 34 is connected to the feed system for controlling the pressure in the first and second branches 26, 28. The piston means 34 may be hydraulic, as shown, or may be electrically or spring powered.

The method of controlling the hold pressure according to the embodiment of the invention illustrated in FIG. 1 includes the following steps:

(a) opening the valve 30;

(b) filling the first cooling cavity 18 by pressurizing the injection unit 32;

(c) shutting the valve 30 to withhold thermoplastic material 36 in the first cooling cavity 18;

(d) hold pressurizing the thermoplastic material 36 withheld by the valve 30 in the first cooling cavity 18;

(e) opening the valve 30;

(f) filling the second cooling cavity 22 by pressurizing the injection unit 32;

(g) shutting the valve 30 to withhold thermoplastic material 36 in the second cooling cavity 22; and (h) hold pressurizing the thermoplastic material 36 withheld by the valve 30 in the second cooling cavity 22.

Hold pressure is applied to the thermoplastic material 36 withheld by valve 30 in the respective cooling cavities 18, 22 when the valve 30 is closed.

Step (d) may further include the step of (i) further hold pressurizing the first cooling cavity 18 by protracting the piston means 34.

Step (h) further includes the step of (j) further hold pressurizing the second cooling cavity 22 by protracting the piston means 34.

This method further includes the step of (k) depressurizing the feed system between the valve 30 and the cooling cavities 18, 22 by retracting the piston means 34.

Figure 2:
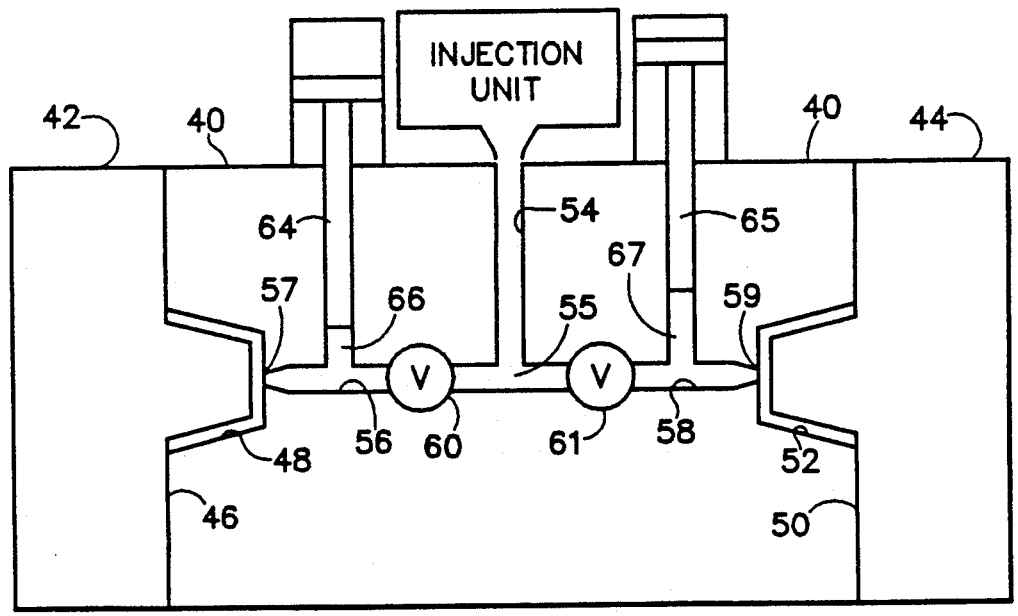
FIG. 2 illustrates an alternative preferred embodiment of the present invention.

Referring to FIG. 2, an alternative preferred embodiment of a multi-part molding system for practising the present invention includes a center part 40 and end parts 42 and 44. The center part 40 and one end part 42 join at a first parting surface 46 and define a first cooling cavity 48. The center part 40 and the other end part 44 join at a second parting surface 50 and define a second cooling cavity 52. The center part 40 may be either a center platten of a molding machine or the center part of a stack mold. An injection unit 62 and the center part 40 define a feed system with a molten core. The feed system includes a runner orifice 54, and is bifurcated at a bifurcation junction 55 into a first branch 56 and a second branch 58. Alternatively, a bifurcation junction may be located in the injection unit, in which case, the injection unit and the center part each has two separate orifices, one for each branch of the feed system. In the system shown in FIG. 2, the first branch 56 terminates in a gate 57 to the first cooling cavity 48; and the second branch 58 terminates in a gate 59 to the second cooling cavity 52. A first valve 60 controls the flow of plastic material through the first branch 56. A second valve 61 controls the flow of plastic material through the second branch 58. An injection unit 62 is disposed to inject molten thermoplastic material into the runner orifice 54. The injection unit 62 is separated from the remainder of the feed system when not being pressurized to inject the plastic material into the runner orifice 54. A first piston means 64 is connected to the first branch 56 for controlling the pressure in the first branch 56. A second piston means 65 is connected to the second branch 58 for controlling the pressure in the second branch 58. The piston means 64, 65 may be hydraulic, as shown, or may be electrically or spring powered.

The method of controlling the hold pressure according to the embodiment of the invention illustrated in FIG. 2 includes the following steps:
(a) opening the first valve 60;
(b) filling the first cooling cavity 48 by pressurizing the injection unit 62;
(c) shutting the first valve 60 to withhold thermoplastic material in the first cooling cavity 48;
(d) hold pressurizing the thermoplastic material 66 withheld by the first valve 60 in the first cooling cavity 48;
(e) opening the second valve 61;
(f) filling the second cooling cavity 52 by pressurizing the injection unit 62;
(g) shutting the second valve 61 to withhold thermoplastic material in the second cooling cavity 52; and
(h) hold pressurizing the thermoplastic material 67 withheld by the second valve 61 in the second cooling cavity 52.

Hold pressure is applied to the thermoplastic material 66 withheld by valve 60 in the first cooling cavity 48 when the valve 60 is closed.

Hold pressure is applied to the thermoplastic material 67 withheld by valve 61 in the second cooling cavity 52 when the valve 61 is closed.

Step (d) may further include the step of
(i) further hold pressurizing the first cooling cavity 48 by protracting the first piston means 64.

Step (h) may further include the step of
(j) further hold pressurizing the second cooling cavity 52 by protracting the second piston means 65.

This method further includes the steps of
(k) depressurizing the first branch 56 between the first valve 60 and the first cooling cavity 48 by retracting the first piston means 64; and
(l) depressurizing the second branch 58 between the second valve 61 and the second cooling cavity 52 by retracting the second piston means 65.

It is usually desirable to obtain a high injection pressure at the gate to the cooling cavity immediately as the injection is started. But due to the feed system of a multi-parting injection molding system tending to be rather long in distance, and the hot molten plastic material quite compressible, such high injection pressure at the gate is difficult to obtain. It should be noted that the piston means of the system and method of the present invention may be used to increase initial pressure at the gate at the beginning of injection.

I claim:
1. A method of controlling hold pressure applied to cooling cavities of a stacked multi-parting injection molding system having desynchronized injection periods, including a center part and first and second end parts disposed for movement with respect to each other along a common axis and defining a first cooling cavity between the center part and the first end part and a second cooling cavity between the center part and the second end part, when cyclic injection molding a plastic material by utilizing a combination of the center part and an injection unit which together encompass a feed system that is separated during the molding cycle by the injection unit being separated from the center part, the feed system comprising a first branch with a first valve in the center part for feeding the first cooling cavity and a second branch with a second valve in the center part for feeding the second cooling cavity, the method comprising the cyclic steps of
(a) opening the first valve;
(b) filling the first cooling cavity with plastic material by pressurizing the injection unit;
(c) shutting the first valve to withhold said plastic material in the first cooling cavity;
(d) hold pressurizing the plastic material withheld by the first valve in the first cooling cavity;
(e) opening the second valve;
(f) filling the second cooling cavity with plastic material by pressurizing the injection unit;
(g) shutting the second valve to withhold said plastic material in the second cooling cavity;
(h) hold pressurizing the plastic material withheld by the second valve in the second cooling cavity; and
(i) separating the injection unit from the center part at a time when the injection unit is not being pressurized in accordance with step (b) or step (f);
wherein the first branch between the first valve and the first cooling cavity is connected to a first piston means, and wherein the second branch between the second valve and the second cooling cavity is connected to a second piston means;
wherein step (d) further comprises the step of
(j) further hold pressurizing the first cooling cavity by protracting the first piston means; and
wherein step (h) further comprises the step of
(k) further hold pressurizing the second cooling cavity by protracting the second piston means.

2. A method according to claim 1, wherein the first and second piston means are located in the center part.

3. A method of controlling hold pressure applied to cooling cavities of a stacked multi-parting injection molding system having desynchronized injection periods, including a center part and first and second end parts disposed for movement with respect to each other along a common axis and defining a first cooling cavity between the center part and the first end part and a second cooling cavity between the center part and the second end part, when cyclic injection molding a plastic material, wherein the center part encompasses a feed system for receiving injected plastic material from a pressurized injection unit, for feeding the injected plastic material to the first cooling cavity and for feeding the injected plastic material to the second cooling cavity; means for separating said injection unit from the feed system at a time when the injection unit is not being pressurized to fill the first cooling cavity or the second cooling cavity; a first valve in the feed system in the center part for enabling plastic material to flow from the injection unit to the first cooling cavity when the first valve is open, and for withholding injected plastic within the feed system when the first valve is closed; a first piston means in the center part connected to the feed system between the first valve and the first cooling cavity for applying hold pressure to plastic material withheld in at least a part of the feed system between the first valve and the first cooling cavity; a second valve in the feed system in the center part for enabling plastic material to flow from the injection unit to the second cooling cavity when the second valve is open, and for withholding injected plastic within the feed system when the second valve is closed; and a second piston means in the center part connected to the feed system between the second valve and the second cooling cavity for applying hold pressure to plastic material withheld in at least a part of the feed system between the second valve and the second cooling cavity, the method comprising the cyclic steps of (a) opening the first valve;
(b) filling the first cooling cavity with plastic material by pressurizing the injection unit;
(c) shutting the first valve to withhold said plastic material in the first cooling cavity;
(d) hold pressurizing the plastic material withhheld by the first valve in the first cooling cavity by protracting the first piston means;
(e) separating the injection unit from the center part at a time when the injection unit is not being pressurized in accordance with step (b);
(f) opening the second valve;
(g) filling the second cooling cavity with plastic material by pressurizing the injection unit;
(h) shutting the second valve to withhold said plastic material in the second cooling cavity;
(i) hold pressurizing the plastic material withheld by the second valve in the second cooling cavity by protracting the second piston means; and
(j) separating the injection unit from the center part at a time when the injection unit is not being pressurized in accordance with step (g).

4. An injection molding apparatus in which hold pressure to cooling cavities of a stacked multi-parting injection molding system having desynchronized injection periods, including a center part and first and second end parts disposed for movement with respect to each other along a common axis and defining a first cooling cavity between the center part and the first end part and a second cooling cavity between the center part and the second end part, is controlled when cyclic injection molding a plastic material by utilizing a combination of the center part and an injection unit which together encompass a feed system that is separated during the molding cycle by the injection unit being separated from the center part, the feed system comprising a first branch with a first valve in the center part for feeding the first cooling cavity and a second branch with a second valve in the center part for feeding the second cooling cavity, the apparatus comprising means for opening the first valve;
means for filling the first cooling cavity with plastic material by pressurizing the injection unit;
means for shutting the first valve to withhold said plastic material in the first cooling cavity;
means for hold pressurizing the plastic material withheld by the first valve in the first cooling cavity;
means for opening the second valve;
means for filling the second cooling cavity with plastic material by pressurizing the injection unit;
means for shutting the second valve to withhold said plastic material in the second cooling cavity;
means for hold pressurizing the plastic material withheld by the second valve in the second cooling cavity; and
means for separating the injection unit from the center part at a time when the injection unit is not being pressurized to fill the first cooling cavity or the second cooling cavity;
wherein the first branch between the first valve and the first cooling cavity is connected to a first piston means, and wherein the second branch between the second valve and the second cooling cavity is connected to a second piston means;
wherein the means for hold pressurizing the first cooling cavity include means for protracting the piston means; and
wherein the means for hold pressurizing the second cooling cavity include means for protracting the piston means.

5. An apparatus according to claim 4, wherein the first and second piston means are located in the center part.

6. A stacked multi-parting injection molding apparatus, including a center part and first and second end parts disposed for movement with respect to each other along a common axis and defining a first cooling cavity between the center part and the first end part and a second cooling cavity between the center part and the second end part, wherein the center part encompasses a feed system for receiving injected plastic material from a pressurized injection unit, for feeding the injected plastic material to the first cooling cavity and for feeding the injected plastic material to the second cooling cavity, and means for separating said injection unit from the feed system at a time when the injection unit is not being pressurized to fill the first cooling cavity or the second cooling cavity, the apparatus further comprising a first valve in the feed system in the center part for enabling plastic material to flow from the injection unit to the first cooling cavity when the first valve is open, and for withholding injected plastic within the feed system when the first valve is closed;
a first piston means in the center part connected to the feed system between the first valve and the first cooling cavity for applying hold pressure to plastic material withheld in at least a part of the feed system between the first valve and the first cooling cavity;
a second valve in the feed system in the center part for enabling plastic material to flow from the injection unit to the second cooling cavity when the second valve is open, and for withholding injected plastic within the feed system when the second valve is closed; and
a second piston means in the center part connected to the feed system between the second valve and the second cooling cavity for applying hold pressure to plastic material withheld in at least a part of the feed system between the second valve and the second cooling cavity.

* * * * *